US011134055B2

(12) United States Patent
Sun et al.

(10) Patent No.: US 11,134,055 B2
(45) Date of Patent: Sep. 28, 2021

(54) NAMING SERVICE IN A DISTRIBUTED MEMORY OBJECT ARCHITECTURE

(71) Applicant: MemVerge, Inc, San Jose, CA (US)

(72) Inventors: Jiajie Sun, Shanghai (CN); Kunwu Huang, Shanghai (CN); Yuanjie Wu, Shanghai (CN); Ning Xu, Shanghai (CN); Yue Li, Fremont, CA (US); Jie Yu, Shanghai (CN); Robert W Beauchamp, Berlin, MA (US)

(73) Assignee: MEMVERGE, INC., San Jose, CA (US)

( * ) Notice: Subject to any disclaimer, the term of this patent is extended or adjusted under 35 U.S.C. 154(b) by 16 days.

(21) Appl. No.: 16/372,184

(22) Filed: Apr. 1, 2019

(65) Prior Publication Data
US 2020/0045010 A1 Feb. 6, 2020

Related U.S. Application Data

(63) Continuation-in-part of application No. 16/255,414, filed on Jan. 23, 2019, now Pat. No. 11,061,609.
(Continued)

(51) Int. Cl.
H04L 29/12 (2006.01)
G06F 3/06 (2006.01)
(Continued)

(52) U.S. Cl.
CPC .......... H04L 61/1552 (2013.01); G06F 3/067 (2013.01); G06F 3/0611 (2013.01);
(Continued)

(58) Field of Classification Search
CPC ............. H04L 61/1552; H04L 67/1065; G06F 3/0643; G06F 9/5016; G06F 9/5077;
(Continued)

(56) References Cited

U.S. PATENT DOCUMENTS 5,787,247 A 7/1998 Norin et al.
7,162,476 B1 1/2007 Belair et al.
(Continued)

FOREIGN PATENT DOCUMENTS

CN 103353867 A 10/2013
CN 104994168 A 10/2015

OTHER PUBLICATIONS

"Ma et al. ""An Efficient Framework for Implementing Persist Data Structures on Remote NVM."" Sep. 2018. arXiv. https://arxiv.org/abs/1 809.09395v1.".
(Continued)

Primary Examiner — Tasnima Matin

(57) ABSTRACT

Disclosed herein is an apparatus and method for a naming service in a distributed memory object system. In one embodiment, a name service method includes electing a primary node for the master key value store from a plurality of name service nodes, the primary node to receive master key value requests, a master key value store containing an entry for each directory within the distributed memory object, wherein the master key value store is configured for associating a directory pathname to a uniform unique identifier, and replicating the master key value store across the plurality of name service nodes. In another embodiment, a name service computing device includes a primary node for the master key value store, wherein the primary node is selected from a plurality of name service nodes and is configured to receive master key value requests, a master key value store containing an entry for each directory within the distributed memory object, wherein the master key value store is configured to associate a directory pathname to a uniform unique identifier, and the system further being in communication with the plurality of name service nodes,
(Continued)

wherein the master key value store is replicated across the plurality of name service nodes.

16 Claims, 15 Drawing Sheets

Related U.S. Application Data

(60) Provisional application No. 62/713,537, filed on Aug. 2, 2018.

(51) Int. Cl.
*H04L 29/08* (2006.01)
*G06F 9/50* (2006.01)
*G06F 12/084* (2016.01)

(52) U.S. Cl.
CPC .......... *G06F 3/0643* (2013.01); *G06F 9/5016* (2013.01); *G06F 9/5077* (2013.01); *G06F 12/084* (2013.01); *H04L 67/1065* (2013.01)

(58) Field of Classification Search
CPC ...... G06F 3/067; G06F 12/084; G06F 3/0611; G06F 3/0659; G06F 12/08; G06F 12/109; G06F 2212/657; G06F 2212/152
See application file for complete search history.

(56) References Cited

U.S. PATENT DOCUMENTS

| | | | |
|---|---|---|---|
| 7,328,319 | B1 | 2/2008 | Bottomley |
| 9,515,878 | B2 | 12/2016 | Wu et al. |
| 10,432,721 | B2 | 10/2019 | Vermeulen et al. |
| 10,445,292 | B1 | 10/2019 | Zhang et al. |
| 10,511,484 | B1* | 12/2019 | Yu ...................... H04L 41/0803 |
| 2002/0103815 | A1 | 8/2002 | Duvillier et al. |
| 2006/0106832 | A1 | 5/2006 | Ben-Dyke et al. |
| 2007/0156842 | A1* | 7/2007 | Vermeulen ........ H04L 29/06047 709/217 |
| 2009/0240664 | A1* | 9/2009 | Dinker .................. G06F 16/27 |
| 2013/0173853 | A1 | 7/2013 | Ungureanu et al. |
| 2013/0218840 | A1 | 8/2013 | Smith et al. |
| 2014/0012995 | A1* | 1/2014 | Zhang ................. H04L 41/0806 709/226 |
| 2015/0278397 | A1* | 10/2015 | Hendrickson ....... G06F 16/9024 707/798 |
| 2016/0004480 | A1 | 1/2016 | Lakshman |
| 2016/0103845 | A1 | 4/2016 | Yeddanapudi et al. |
| 2016/0117254 | A1 | 4/2016 | Susarla et al. |
| 2016/0342341 | A1 | 11/2016 | Voigt et al. |
| 2016/0342542 | A1 | 11/2016 | Voigt |
| 2016/0364158 | A1 | 12/2016 | Narayanan et al. |
| 2017/0003899 | A1 | 1/2017 | Raja et al. |
| 2017/0123945 | A1* | 5/2017 | Panasko .................. G06F 3/067 |
| 2017/0168953 | A1 | 6/2017 | Xu et al. |
| 2017/0177222 | A1 | 6/2017 | Singh et al. |
| 2017/0212939 | A1 | 7/2017 | Mukherjee et al. |
| 2017/0220777 | A1 | 8/2017 | Wang et al. |
| 2018/0074971 | A1 | 3/2018 | Maxey et al. |
| 2018/0136842 | A1 | 5/2018 | Kim et al. |
| 2018/0322058 | A1 | 11/2018 | Tourrilhes et al. |
| 2018/0343131 | A1 | 11/2018 | George et al. |
| 2019/0102287 | A1 | 4/2019 | Cayton et al. |
| 2020/0045010 | A1 | 2/2020 | Sun et al. |

OTHER PUBLICATIONS

Malinowski et al. "A Parallel MPI 1/0 Solution Supported by Byte-addressable Non-volatile RAM Distributed Cache." 2016. PTI. Position Papers of the Federated Conference on Computer Science and Information Systems. vol. 9. pp. 133-140.

Shan et al. "Distributed Shared Persistent Memory." Sep. 2017. ACM. SoCC '17. pp. 323-337.

Sundararaman et al. "Towards Software Defined Persistent Memory: Rethinking Software Support for Heterogenous Memory Architectures." Oct. 2015. ACM. INFLOW'15.

Tsai et al. "Building Atomic, Crash-Consistent Data Stores with Disaggregated Persistent Memory." Jan. 2019. arXiv. https://arxiv.org/abs/1901.01628v1.

International Search Report received International Application No. PCT/CN2019/077100 dated Jun. 11, 2019, 2 pages.

\* cited by examiner

NAMING SERVICE IN A DISTRIBUTED MEMORY OBJECT ARCHITECTURE

CROSS-REFERENCE TO RELATED APPLICATION(S)

This application claims the benefit of and priority to U.S. Provisional Patent Application Ser. No. 62/713,537, filed on Aug. 2, 2018 for "Distributed Memory Object Architecture that Enables Memory-Speed Data Access for both Memory Semantics and Storage Semantics in a Distributed Environment", and 2) U.S. Non-provisional patent application Ser. No. 16/255,414, filed on Jan. 23, 2019 for "A Distributed Memory Object Architecture", the entire disclosure of which are incorporated herein by references.

TECHNICAL FIELD

The present disclosure relates generally to distributed computing environments, and more particularly, to a naming service in a distributed memory object architecture that enables memory-speed data access for both memory semantics and storage semantics in a distributed environment.

BACKGROUND

The computer industry continues to develop and refine solid-state storage devices and media, moving closer and closer to achieving memory-class storage. In the past decade there has been a thousand-fold reduction in access latency of affordable storage devices, and another twenty-fold reduction is expected within the year. At the same time, networking speeds have seen more than a 100-time increase in bandwidth with commensurate latency decrease, plus the emergence of standardized remote direct memory access (RDMA) functionality that can improve communication efficiency and further reduce latency.

These faster computing infrastructures demand new data infrastructures where both memory-speed data access and disk-like high storage density are strongly desired at the same time. Such new data infrastructures promise to bring significant performance improvements to computing tasks whose working data sets exceed dynamic random access memory (DRAM) capacity, and where highly frequent data movements between DRAM and lower storage tiers, such as solid state drive (SSD) and hard disk drive (HDD), are therefore required.

To provide the lowest possible access latency, operating system support of emerging persistent memory (Pmem) technology has created mechanisms for a user-space application to have direct access (DAX) to persistent memory media (i.e., without the access being performed by operating system software). Examples of existing solutions include:

"NOVA" is a single-node file system for persistent memory with emphasis on consistency. It uses per-file metadata journals for fast, concurrent, consistent updates. It supports DAX memory mapped access. It, however, does not provide cross-node replication or availability.

"Strata" is a single-node file system that provides a tiered, log-structured file system starting from a persistent memory layer and progressing to SSD then HDD as the data access frequency cools. It, however, does not support DAX memory map access, nor provide cross-node replication or availability.

"Octopus" is a multi-node distributed persistent memory file system using tightly integrated RDMA to reduce communication latency. It, however, does not support DAX memory mapped access.

"Hotpot" is a multi-node kernel-level distributed shared persistent memory system that provides low latency, transparent memory accesses, data persistence, data reliability, and high availability. It is focused on memory mapped access and does not address standard file storage IO operations.

"FluidMem" is a multi-node system that realizes disaggregated memory in the datacenter. It does not address memory persistence or storage IO.

None of these existing solutions, however, provide low-latency access of multi-node distributed data objects with both the semantics of memory and the semantics of file storage. It is therefore desirable to provide low-latency memory spaces: 1) that are accessible across a cluster of nodes, 2) that can exceed the memory capacity of a given node in the cluster, and 3) that can span the memory and storage of multiple nodes. It is further desirable that these memory spaces be accessible with either the load/store semantics of memory, or with the read/write, input/output semantics of file storage. Disclosed herein in a distributed memory object (DMO) system, referred to as MemVerge DMO system, that provides these types of low-latency memory spaces.

SUMMARY

Disclosed herein is an apparatus and method for a naming service in a distributed memory object system. In one embodiment, a name service method includes electing a primary node for the master key value store from a plurality of name service nodes, the primary node to receive master key value requests, a master key value store containing an entry for each directory within the distributed memory object, wherein the master key value store is configured for associating a directory pathname to a uniform unique identifier, and replicating the master key value store across the plurality of name service nodes.

In another embodiment, a name service computing device includes a primary node for the master key value store, wherein the primary node is selected from a plurality of name service nodes and is configured to receive master key value requests, a master key value store containing an entry for each directory within the distributed memory object, wherein the master key value store is configured to associate a directory pathname to a uniform unique identifier, and the system further being in communication with the plurality of name service nodes, wherein the master key value store is replicated across the plurality of name service nodes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Various aspects of apparatuses and methods will now be presented in the detailed description by way of example, and not by way of limitation, with reference to the accompanying drawings, wherein.

DETAILED DESCRIPTION

As used in the following description, remote direct memory access (RDMA) refers to a direct memory access mechanism that enables a computer to access the memory of another computer without involving the operating system of either computer. Persistent memory (Pmem) refers to the storage of data structures such that the data can continue to be accessed using memory instructions, e.g., load and store, even after completion of the process that created or modified the data structures.

Figure 1:
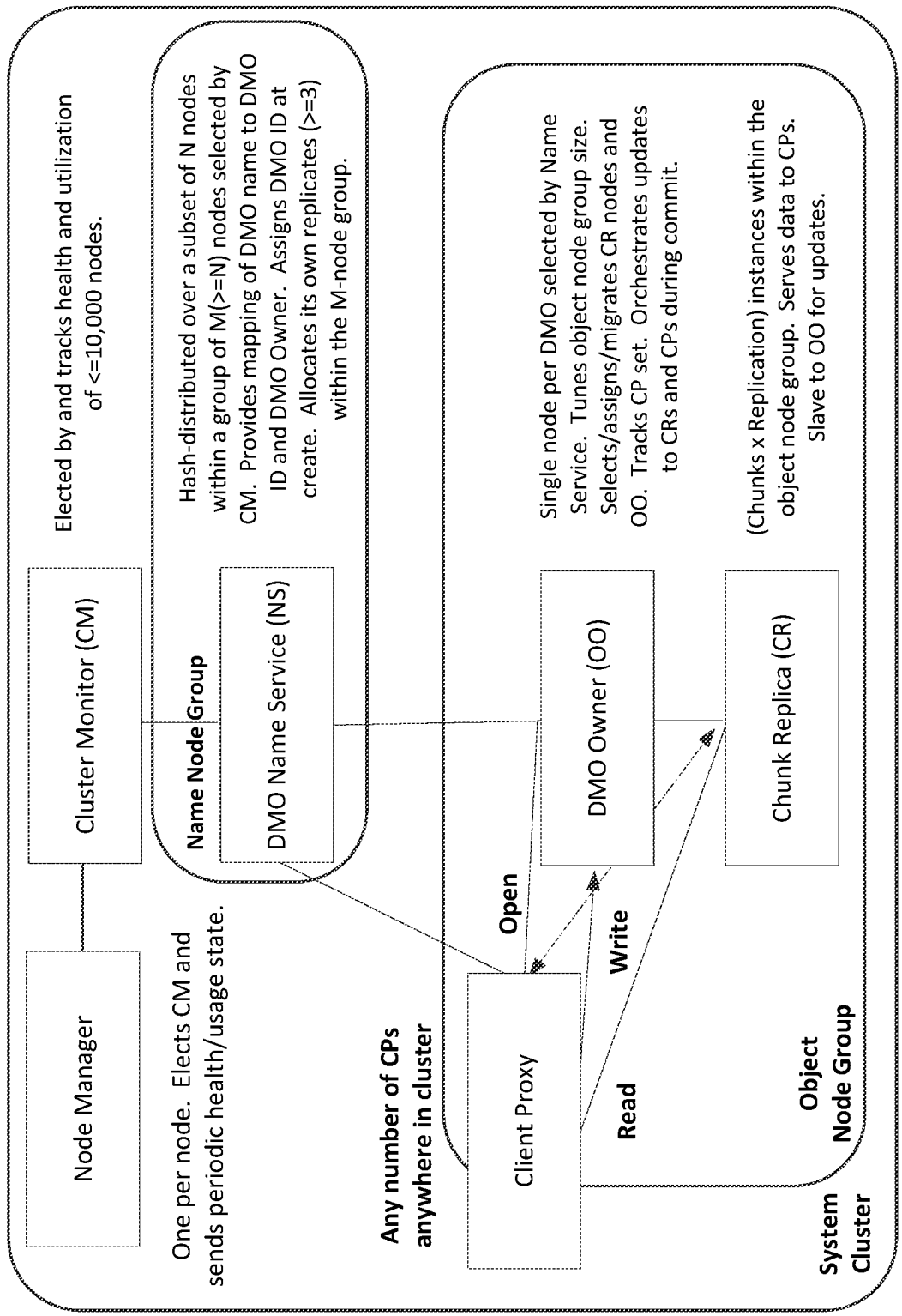
FIG. 1 is an illustration of a system cluster that includes an object node group that implements a distributed memory object (DMO) system, referred to herein a MemVerge DMO system, that provides persistent DMOs that can be accessed as either in-memory mode or file-storage mode.

FIG. 1 is an illustration of a MemVerge DMO system that provides persistent distributed memory objects (DMOs) that can be accessed as either in-memory mode or file-storage mode. The system cluster is formed by a number of nodes. Each node includes a memory, a processor and a network interface through which it may send and receive messages and data. FIGS. 1-4 illustrate an example environment that a naming service as disclosed herein can operate within. After describing the example environment, additional aspects of embodiments are further discussed with reference to FIGS. 5-15.

With reference to FIG. 1, a MemVerge DMO system provides for the creation of sharable memory spaces, each space being a DMO with a single owner node. These owner nodes are referred to herein as object owner (OO) nodes. The address space for a DMO may be partitioned into equal size chunks, with each chunk being stored on one or more chunk replica (CR) nodes included in the cluster of nodes. The chunks are distributed among a subset of the cluster nodes in such a manner as to: 1) focus locality of the chunks for performance efficiency, 2) provide sufficient availability of address space, and to 3) balance resources among the cluster of nodes.

Any node in the cluster using a DMO may locally keep a copy of any page. A node that uses a DMO is referred to as a client proxy (CP) node. The object owner node is responsible for coordinating updates to the client proxy nodes as well as the chunk replica nodes. The object owner node is also responsible for maintaining a configurable replication factor per DMO. The object owner node and chunk replica nodes can migrate to deal with failures, performance, or resource constraints. Client proxy nodes and chunk replica nodes cooperate with the object owner node in implementing protocols to make coherent updates and thereby provide a crash consistent view in the face of failures.

With continued reference to FIG. 1, a system cluster within which a MemVerge DMO system may be implemented includes an object node group and various other nodes. The following functional components are associated with one or more nodes in the system cluster:

Node Manager (NM)

The mode manager (NM) runs on each node in the MemVerge DMO system. The node manager is the entity that starts on a node and starts (or stops) all other services associated with a node, some automatically and some by request. The node manager is responsible for finding or electing the cluster manager (CM,) and then to notify, e.g., heartbeat, its existence and node health to the cluster manager. Hence the node manager has access to performance and exception information from other components.

Cluster Manager (CM)

The cluster manager (CM) runs on a single node in the MemVerge DMO system. The single node on which the cluster manager runs is elected by a consensus algorithm of the node managers. The cluster manager mediates cluster membership, node ID assignment, and the name service (NS) group. The cluster manager also chooses nodes to satisfy allocation request constraints against cluster resource loading.

DMO Name Service (NS)

The DMO name service (NS) is a hash-distributed service which provides mapping of a DMO name string to its object ID and the object owner. The service is hash distributed across a set of nodes (the name service group, determined by the cluster manager) in the system cluster.

Object Owner (OO)

The DMO object owner (OO) is a single-node service that manages a DMO. The node corresponding to the client proxy that creates the DMO becomes the object owner node. The object owner is responsible for selecting (via a cluster manager) an initial object node group to contain the DMO and for assigning the chunk replicas (CRs) within that node group. The object owner also manages growing, shrinking, migrating, and recovering both the node group as a whole, and the chunk replica assignments within that group, as required to meet the DMO's size and replication requirement, or to optimize its usage efficiency. The object owner can choose to move to another node (e.g., to be on the same node as a write client proxy). If the object owner node fails, the DMO's node group will re-elect an object owner. The object owner keeps track of client proxies and orchestrates all updates affecting the DMO, e.g., configuration changes as well as data writes (msync commits and/or write IO).

Chunk Replica (CR)

The chunk replica (CR) is a slave entity to the object owner and client proxy. The object owner and client proxy read from and write to the chunk replica. The chunk replica owns some amount of storage devices (Pmem, SSD, etc.) on its node and manages the details of how/where a chunk of address space is stored therein.

Client Proxy (CP)

The client proxy (CP) performs all input/output operations for the client and locally materializes and synchronizes/persists any object that the client requests to be memory mapped. To do that materialization, the client proxy creates a local cache for pieces of remote chunks that are in use and manages selection and eviction of pieces that are unused (or less actively used) as capacity constraints require. The client proxy has code to specifically handle page fault notifications sent to it by the userfaultfd feature of Linux.

Example Operation Flows

Figure 2:
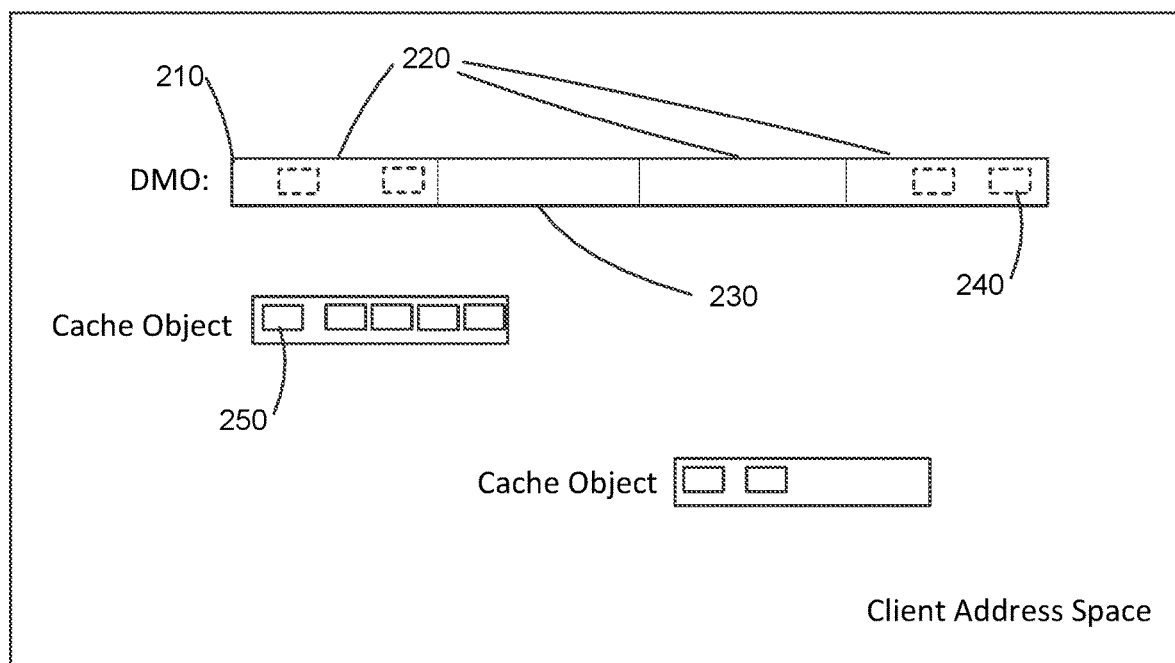
FIG. 2 is an illustration of a DMO in a client address space.

FIG. 2 is an illustration of a DMO in a client address space. When a client proxy opens a DMO, the client proxy allocates 210 a logical address region or space for that DMO and registers the region to monitor for page faults. The client proxy then can direct maps for any local chunks 230 at their appropriate offset within the logical address region. Next, the client proxy acquires a remote direct memory access (RDMA) access descriptor to an instance of each remote chunk. The client proxy then creates and maps one or more persistent memory files to use as a cache 250. Now when the application accesses a region of that DMO space that is not direct mapped, a page fault is signaled and the client proxy's page fault handler will allocate an area of the cache file, fill the cache file via an RDMA read of the appropriate remote chunk area 220, and then map that area of the cache file into its appropriate offset of the DMO region, thus completing the handling of the page fault.

Note that management of the cache capacity may require that a previously allocated area of cache be removed from its current role in the DMO address space (i.e., evicted) in order to reassign it for a new role. This eviction process can typically happen as a background task where an eviction candidate is selected, unmapped from the DMO space, and written back via an RDMA write to its remote location if required. The cache area of that candidate is then freed for reallocation.

With continued reference to FIG. 2 and additional reference to FIG. 1, a client application installed in a client node or local node, which may be any node in the system cluster of FIG. 1, opens a DMO name. For example, the client application may "call" MemVerge library that is included in the client application and may "call" a client proxy (CP). The client proxy then: 1) Calls the DMO name service to get the object owner (OO); 2) Calls the object owner to get table of chunk nodes; 3) Opens "local chunk" files that are on the local node; 4) Opens an empty "cache file" or "cache object" on the local node; and 5) Replies to MemVerge library in the local node with file information including: a file descriptor for the local chunk files on the local node and a file descriptor for the cache file/object. The file descriptor for the local chunks may include an offset within the logical address space for the DMO and a size for the local chunk.

The MemVerge library then can: 1) Map an anonymous memory region equal to the size of the DMO; 2) Register that memory region for user page faults; 3) Over map 240 the local chunk files on that memory region; and 4) Remembers the cache file for later use.

The client application starts using the DMO, i.e., can do load/store references to the DMO, and/or read/write input/output calls to/from the DMO. If a load/store reference from the client application accesses a DMO region that is not over mapped, the client application takes/receives a page fault. The MemVerge library gets a page fault notification and calls to the client proxy. The client proxy caches the needed region into the cache file and replies to the MemVerge library. The MemVerge library over maps 240 the new region onto the appropriate local DMO space.

Thus, from a client application perspective, the MemVerge DMO system enables a user, via the client application in conjunction with a client proxy, to initiate the use of a DMO, have data placed in one or more memory regions mapped to the DMO by either of a store call or a write call, and access data stored in one or more memory regions mapped to the DMO by a load call or a read call.

Implementation Alternatives

To implement larger memory space than physically available on a node, some form of demand paging is necessary. Three implementation approaches are presented: user space, kernel, and hypervisor.

Figure 3:
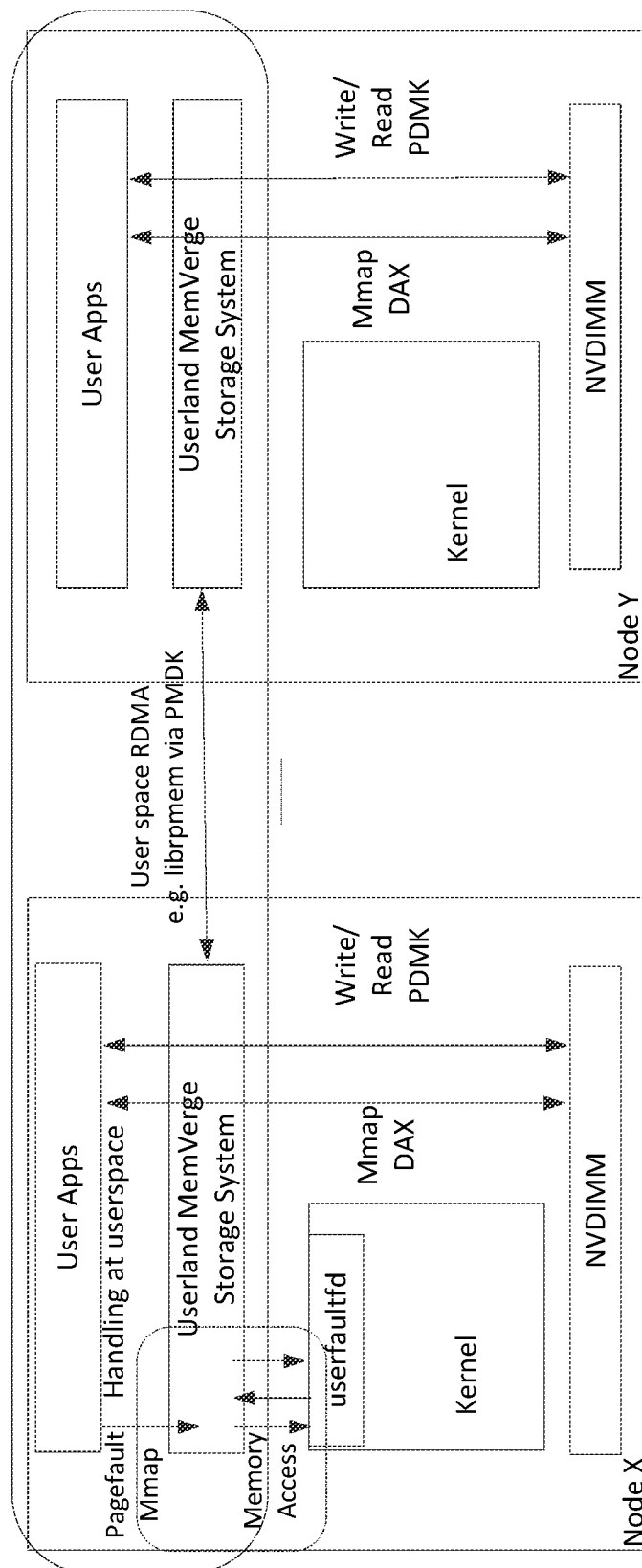
FIG. 3 is an illustration of components and processes of implementing a larger memory space across nodes by a user space approach.

User Space:

FIG. 3 is an illustration of components and processes of implementing a larger memory space across nodes by a user space approach. The user space approach uses the Linux userfaultfd mechanism to monitor the logical address space of the client and provide notification whenever access to a non-resident page of the object is attempted. Since a user space process cannot directly control physical memory mapping, it uses a direct access (DAX) file system to indirectly affect this. The data for the faulting area is copied to a local file and that file is mapped into the client's address space, thus materializing the data for the page fault. This mechanism is the least intrusive to the operating environment in that it does not require a new operating system. A user space approach may provide fast development, which in turn may be beneficial to both prototype and product developments. Furthermore, a user space approach may facilitate experiments with different new technologies invented for user space apps. Additionally, a user space approach may be easy to deploy, easy to containerize, and may easily connect to other user space storage frameworks such as SPDK. However, it may utilize indirect access to memory map Kernel:

The kernel space approach uses the kernel memory management to intercept page faults from the client process. As a kernel entity, the page fault handler can directly manipulate the address map. The handler can maintain a memory pool where it caches a copy of the required data, and then directly map it into the client's address space. A kernel space approach can provide a fast, efficient access to memory map; however, it also could use a custom OS and may increase scope of testing (re-verify OS).

Figure 4:
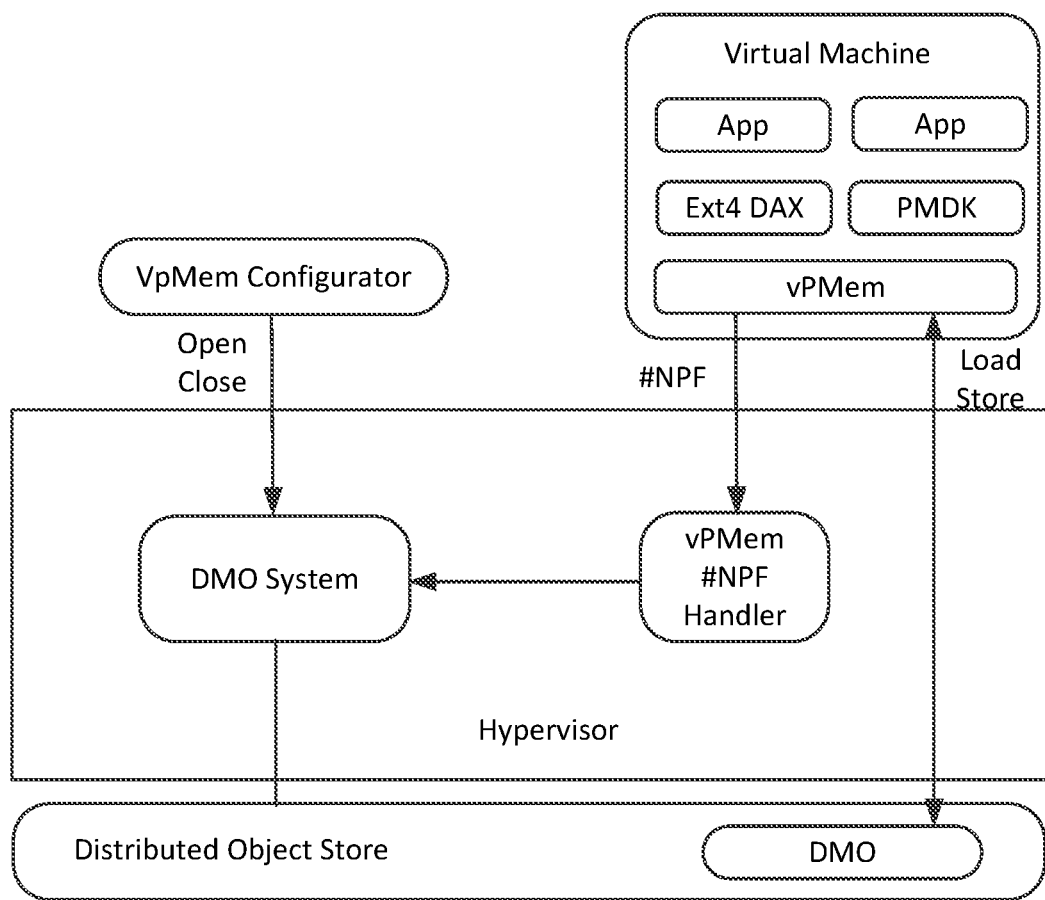
FIG. 4 is an illustration of components and processes of implementing a larger memory space across nodes by a hypervisor approach.

Hypervisor:

FIG. 4 is an illustration of components and processes of implementing a larger memory space across nodes by a hypervisor approach. In the hypervisor approach, one or more virtual PMEM (vPMem) devices is presented to the host operating system. Each vPMem is a logical address space within the hypervisor address map that gets presented to the host operating system as its physical address space. The hypervisor's memory manager intercepts the page faults to that space to materialize the assigned object's data. Analogous to the OS kernel, the hypervisor has direct access to its map. The page fault handler can therefore maintain a memory pool in which it caches required data, and then map that data into the host OS's address space to service the page fault. Note that the page fault can be from a user application in the host OS, or from a host OS component. This approach can provide a fast, efficient access to memory map, and may be more palatable to customers than a custom OS. However, it can be difficult to efficiently host additional hypervisors.

Advantages of the MemVerge DMO System

An advantage of the MemVerge DMO system is that it is the first DMO system to provide persistent distributed memory objects that can be accessed as either in-memory or file-storage mode, and to do so using low-latency RDMA. Thus, the MemVerge DMO system enables use of DMOs both as memory and storage. The MemVerge DMO system also allows data in the system to be converted between in-memory and file-storage modes. This aspect of the MemVerge system is a significant innovation.

On the performance side, the MemVerge DMO system provides close-to-memory-speed data access that is faster than existing solutions. This significantly relieves the data bottlenecks observed by many upper layer applications.

On the information technology deployment side, the MemVerge DMO system design allows the entire system to be built in user space. Therefore, users do not have to install a customized Linux kernel. This is beneficial in that most users prefer not to have to install a customized Linux kernel. Users can easily install MemVerge DMO system software just like installing other user space applications. Furthermore, being able to implement everything in user space eases deployment in a cloud-native environment. MemVerge DMO system applications can be easily containerized and orchestrated in a cluster with massive scale.

Figure 5:
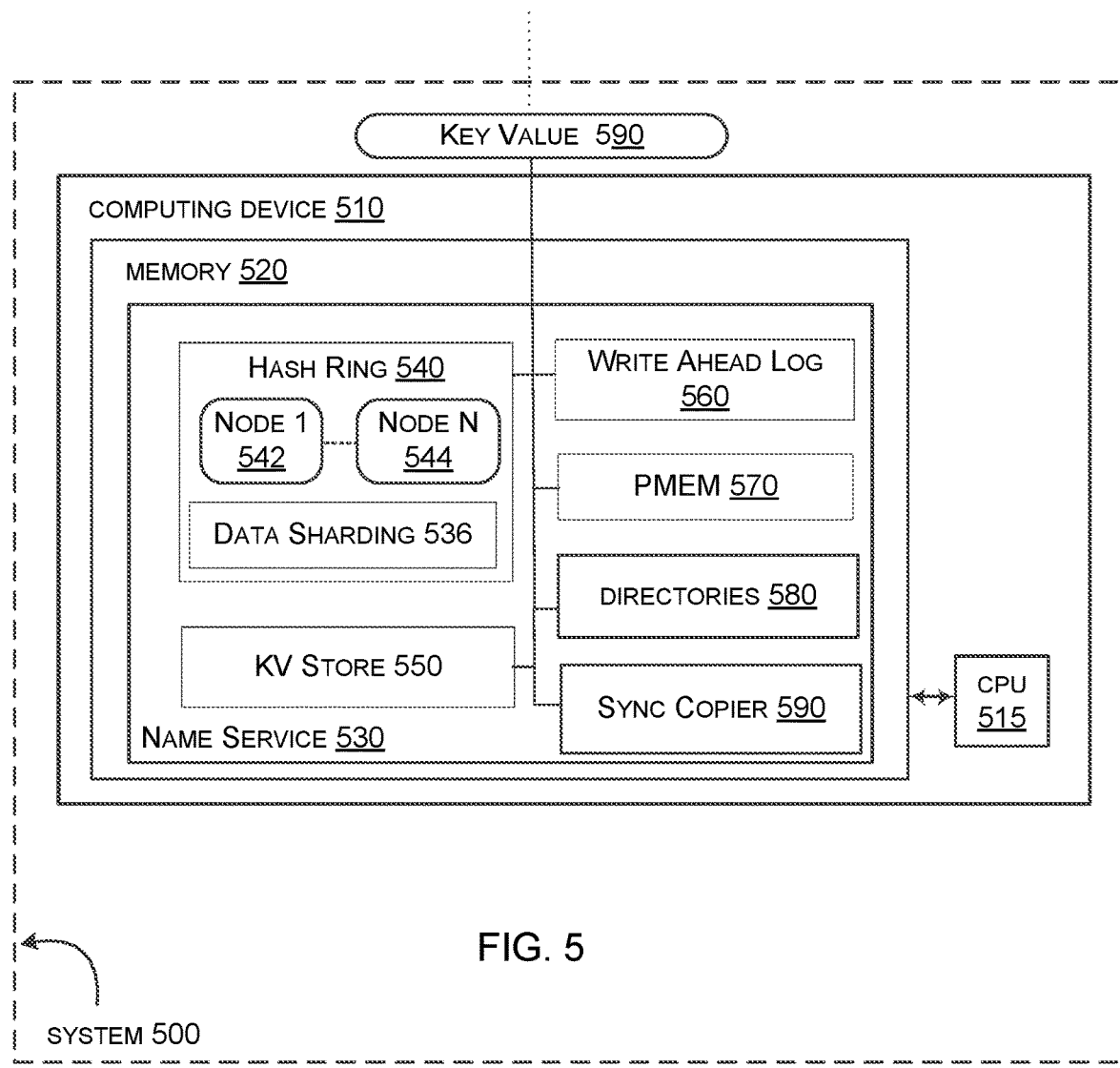
FIG. 5 is an illustration of a computing device running a name service in a DMO system.

FIG. 5 is an illustration of a computing device 510 running a name service 530 in a DMO system 500. In the illustrated embodiment, a name service computing device in a distributed memory object system may comprise memory 520, a hash ring 540 having a plurality of nodes 542-544, a data sharding module 536, a key value store 550, a write ahead log 560, a persistent memory 570, one or more directories 580, and a sync copier 590 resident in memory and in communication with a CPU 515. In this embodiment, the name service may comprise a primary node for the master key value store 550, wherein the primary node is selected from a plurality of name service nodes and is configured to receive master key value requests.

Further, the illustrated embodiment may have a master key value store 550 containing an entry for each directory 580 within the distributed memory object, wherein the master key value store 550 is configured to associate a directory pathname to a uniform unique identifier. In some embodiments, a name service may cache recently opened uniform unique identifiers keyed by their full pathname. Additionally, this embodiment system may further be in communication with the plurality of name service nodes, wherein the master key value store 550 is replicated across the plurality of name service nodes.

In some embodiment systems, each directory may have a separate key value store instance and is identified by the directory's uniform unique identifier. Additionally, each key value store may contain an entry for each of its objects and sub-directories keyed on the object filename. Additionally, a name service may locate a directory using a hash-distribution using the directory uniform unique identifier, as illustrated with more detail with reference to FIG. 8.

In some embodiments the name service node is configured to look up an existing directory by querying a local cache of the name service node using a directory pathname to find the directory uniform unique identifier, and if the directory pathname is not in the local cache, the name service node is configured to query the primary node using a directory pathname to find the directory uniform unique identifier, and install the query result into the local cache. Additionally, the name service may be configured to query a directory pathname to find the directory uniform unique identifier and its primary service node and to send the list directory request to the primary name service node which returns all of the keys in the directory's uniform unique identifier key value store.

System 500 may further comprise the name service node being configured to create a directory when it receives a directory request, wherein the name service node is configured to look up a parent directory to identify its uniform unique identifier and primary name service node, to send a request to the parent directory's primary name service node which creates a uniform unique identifier and an entry for a new directory in the parent directory key value store, to use the new directory uniform unique identifier to locate a primary name service node and then requesting creation of the new directory key value store, and to request a name service master to create an entry for a new directory association and then adding the entry to a local cache.

Figure 6:
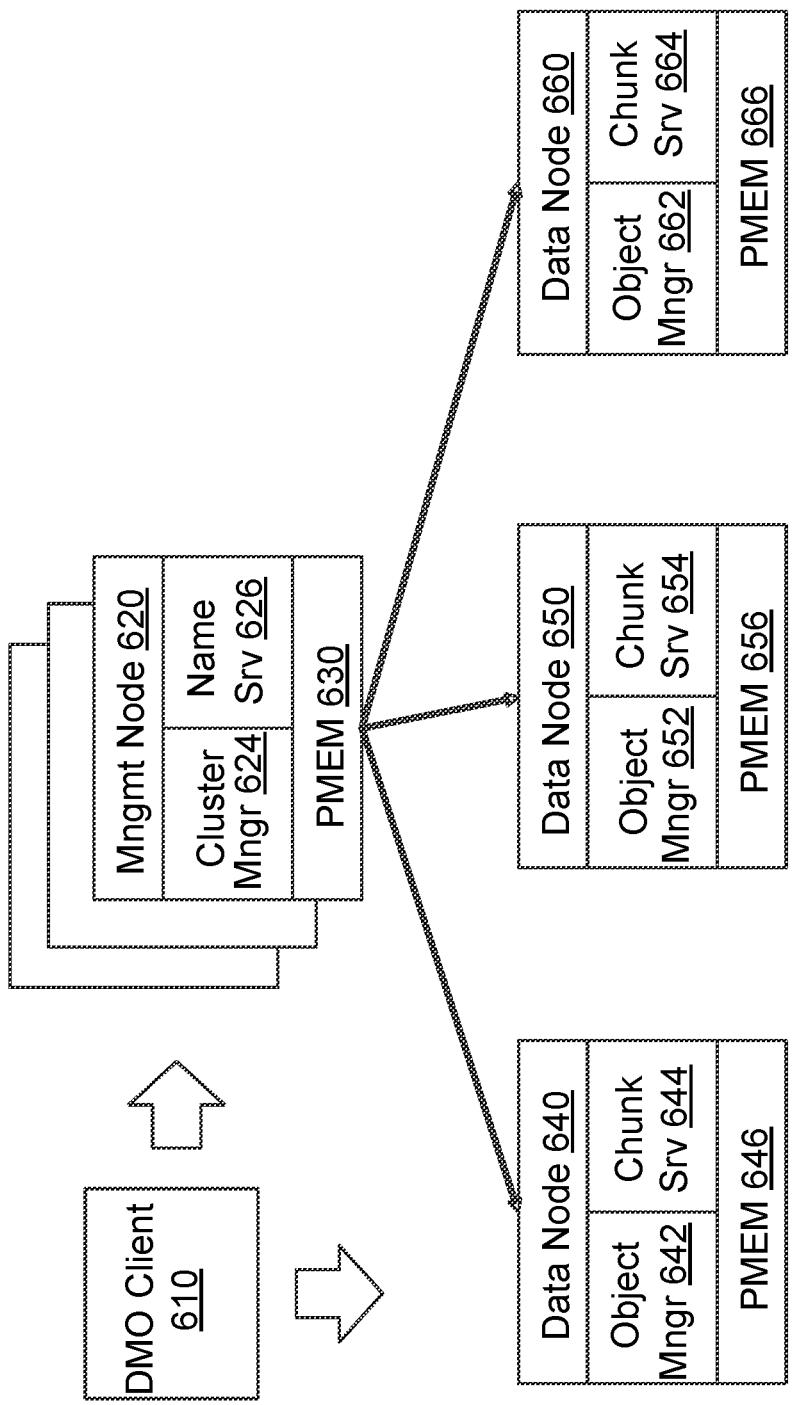
FIG. 6 is an illustration of distributed components and processes of a name service in a DMO system.

FIG. 6 is an illustration of distributed components and processes of a name service in a DMO system. In the illustrated system, a DMO Client 610 may be in communication with both a management node 620 and data nodes 640, 650, and 660. Management node 620 may further have a cluster manager 624, a name service 626 and a persistent memory 630. Data node 640 includes an object manager 642, a chunk service 644 and a persistent memory 646. Data node 650 and 660 are illustrated with similar structures with reference to FIG. 6. In this way, the name service components including 626, 644, 654 and 664 may be a distributed Key Value Store sub-system. In this way, a name service may have persistence of object names and their related information using persistent memory embodiments disclosed herein.

Figure 7:
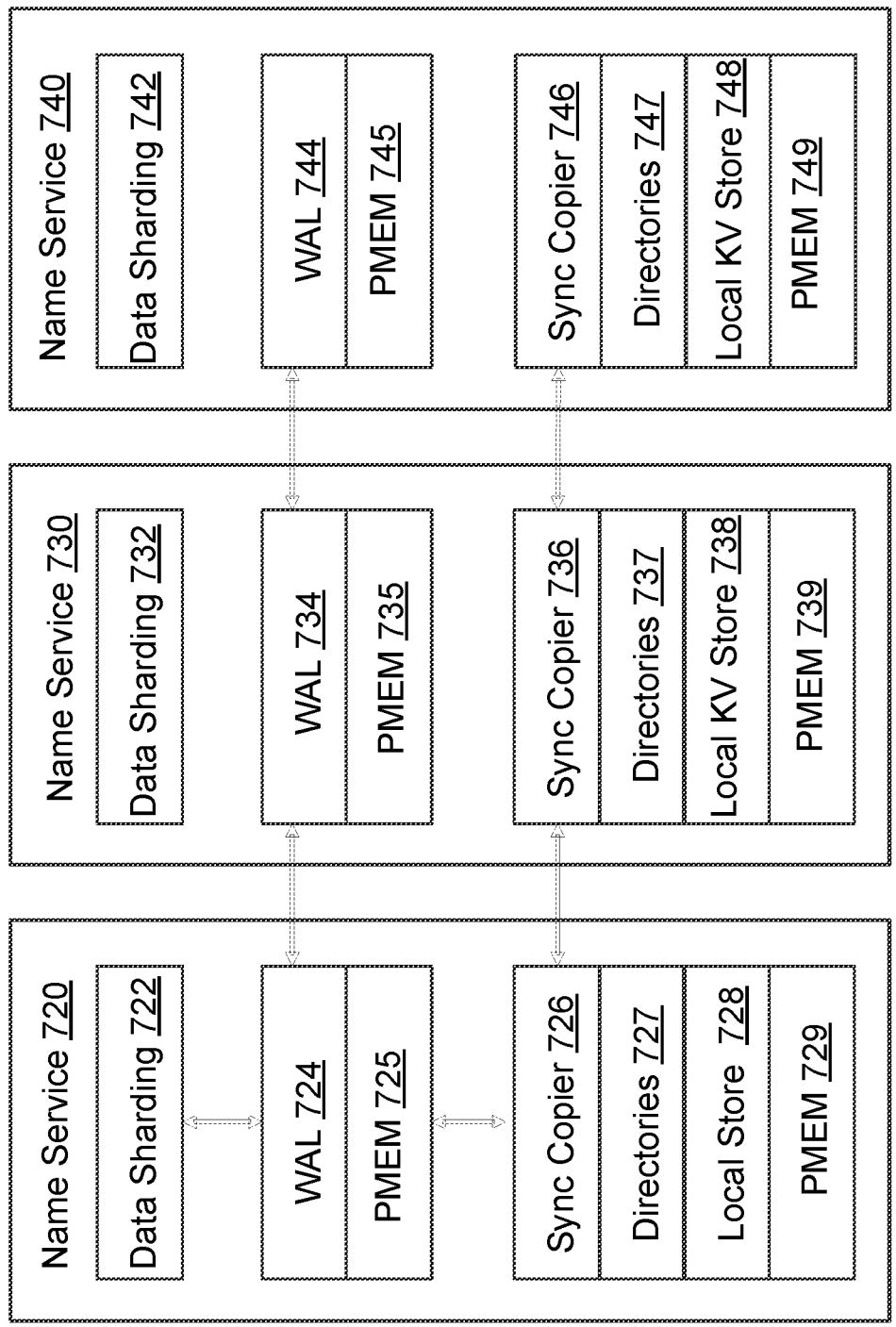
FIG. 7 is an illustration of internal components of a name service.

FIG. 7 is an illustration of internal components of a name service 720, 730 and 740 as disclosed in FIG. 5 and environmentally illustrated in FIG. 6. With reference to FIG. 7, name service 720 will be explained in detail with name services 730 and 740 having similar structure. Name service 720 includes a data sharding module 722. In one embodiment, data sharding module 722 distributes data to different name service nodes for load balancing. Name service 720 further includes a write ahead log 724 for storing persistence transactions. Name service further includes a sync copier 726 for syncing data between name service nodes, directories 727 to be stored in key value stores 728.

Figure 8:
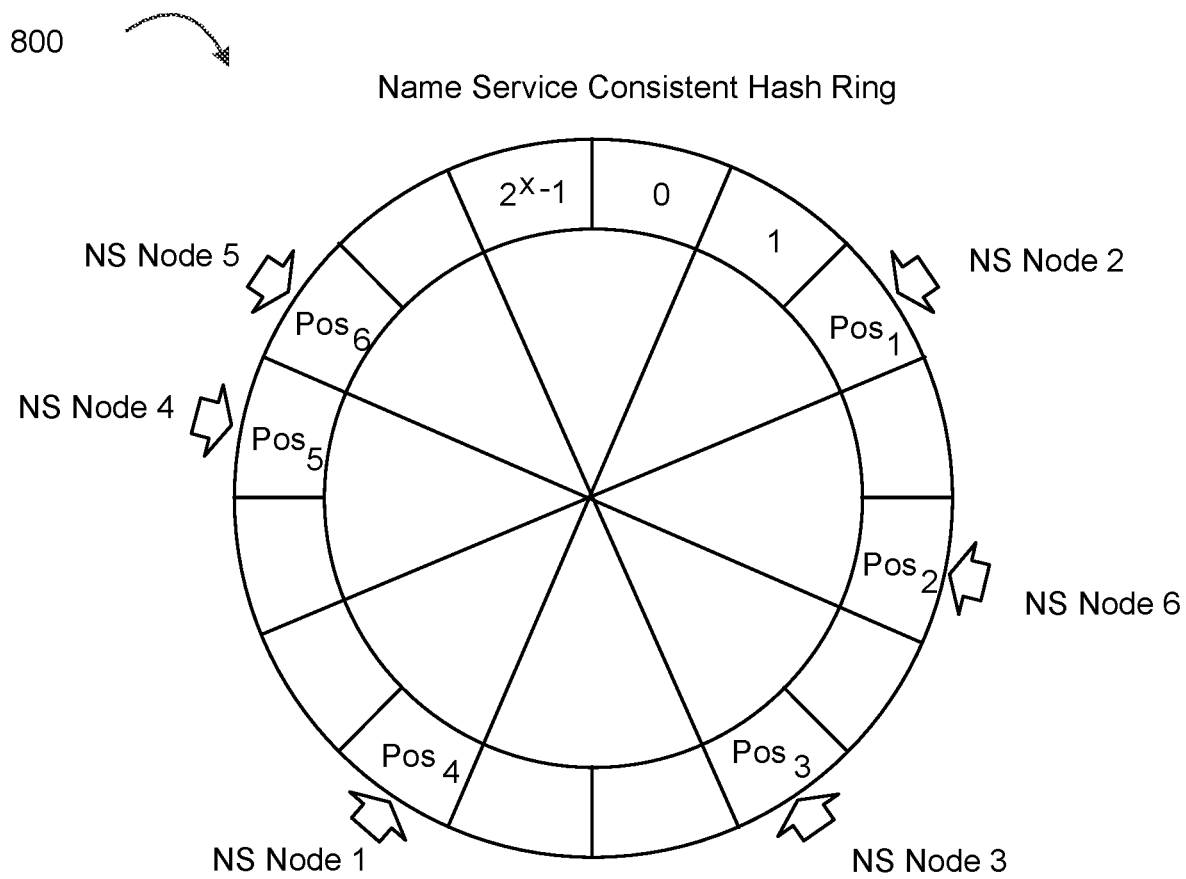
FIG. 8 is an illustration a name service consistent hash ring.

In the embodiments disclosed hereinabove, a name service may utilize a hash ring 800 as depicted in FIG. 8. By way of example, each name service can be hashed into a Consistent Hashing Ring which divided into $2^x$ pieces, which is the capacity of whole nodes within a DMO system. In the present embodiment, when an object operation happens, a client hashes the object to the Consistent Hashing Ring as well, and pick up the closest Name Service Node with clockwise order as Primary to handle the operation. Therefore, name service nodes may be hashed into a consistence ring to reduce the amount of rehashing required when a node is deleted or added to the DMO system.

In some embodiments, to support N-copy replication, data updates may be synchronized to (N−1) additional nodes (Secondaries) in clockwise order. For example, a node may choose the name services nodes in the consistence ring which are located near the primary name service node, and copy the data from primary name service node to these chosen name service nodes, wherein copied data may include object and directory information, for example object name, attribute and so on. Therefore, in the present embodiment, a flat namespace may therefore be used where every name is hash-distributed to a primary node locale. This provides names that can be well-distributed across nodes and also provides a relatively fast look-up since only one hash-locale need be queried Additionally, a directory structure can be emulated by parsing the object name based on a defined separator such as '*I*'. In one example, an object name "/a/b/c" may have a "I" name pre-fix is emulated top directory, "/a/" name pre-fix is emulated $2^{nd}$ level directory, and "/a/b/" name pre-fix is emulated $3^{rd}$ level directory.

Embodiment persistent memory based name services disclosed herein therefore support both object and directory approaches. With reference to FIGS. 5-9, a master key value store 550 instance contains an entry for every directory by associating the directory's full pathname to its uniform unique identifier. This approach saves having to lookup each directory in a pathname. Additional, as the Master key value store is replicated across all Name Service nodes there is a local copy of the master key value store to provide quick access for each name service node.

Additionally, each directory is a separate key value store instance that is identified by the directory's uniform unique identifier. This allows use of the consistent hash ring explained in more detail with reference to FIG. 8, above. Further, as each directory is a separate key value store instance, it may contain an entry for each of its objects and sub-directories keyed on their filename.

Figure 9:
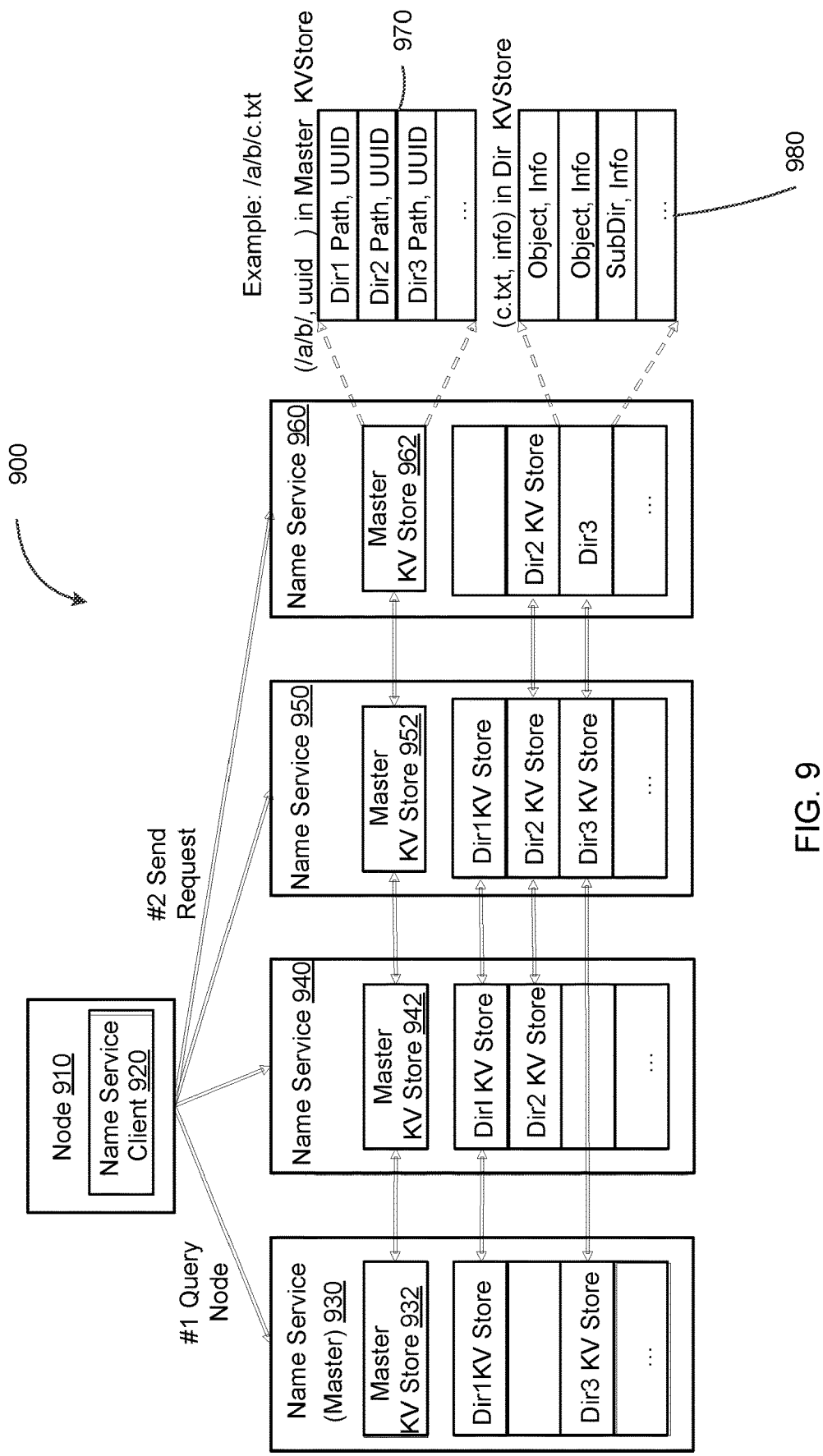
FIG. 9 is an illustration of a name service request from a node to a master name service and over other name service nodes.

FIG. 9 is an illustration of a name service request process 900. In process 900, node 910 queries master name service 930. The name service master node 930 includes a master key value store 932 associating directory paths and uniform unique identifiers, such as depicted at 970, and also includes one or more directory key value stores associating objects and related information, as depicted at 980. The embodiment illustrated in FIG. 9 further includes other nodes with corresponding name service modules, master key value stores and directory key value stores. Additionally, the system may use a primary name service node to control each directory key value store, wherein the directory key value store is used to store information for objects and sub-directories within the subject directory.

Figure 10:
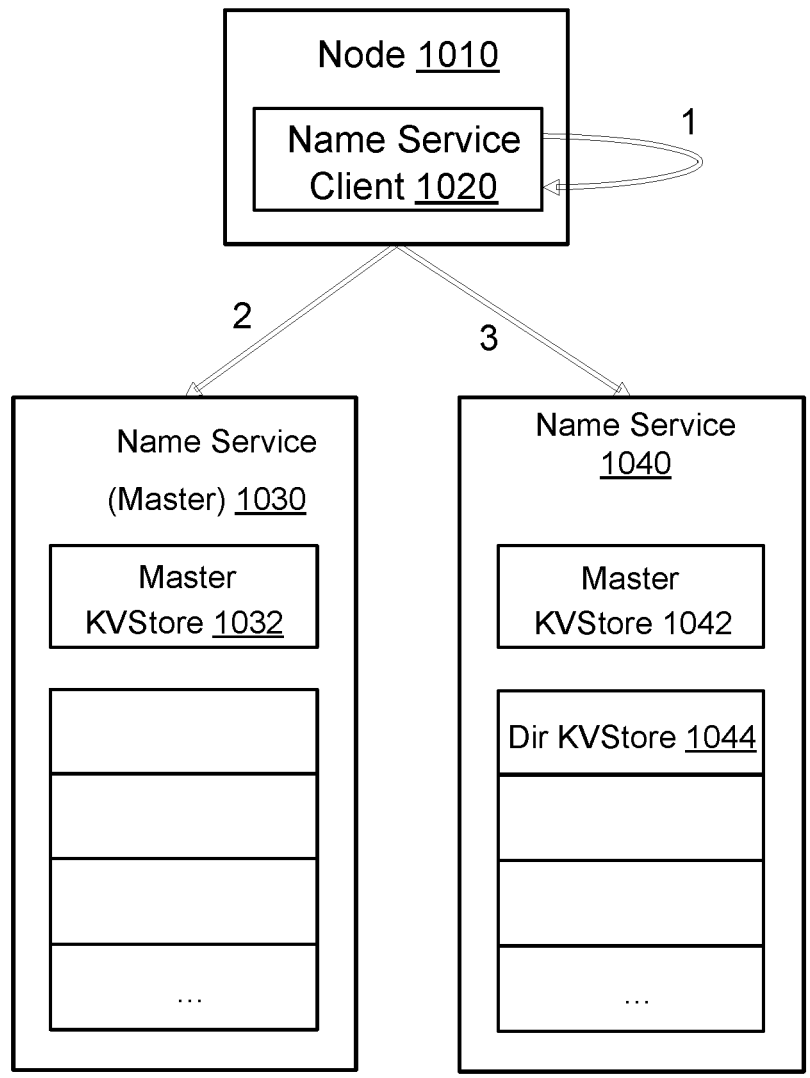
FIG. 10 is an illustration of components and processes of a name service conducting a lookup directory operation.

FIGS. 10-15 depict example process flows for directory lookup, listing a directory, creating a directory, create/remove/lookup an object, renaming a directory and removing a directory. In FIG. 10, components and processes of a name service 1020 conducting a lookup directory operation are illustrated. By way of example, when a name service client 1020 needs to look up an existing directory, the client first queries its local cache 1020 using the directory's pathname to find that directory's uniform unique identifier. If Client local cache misses, the client then may send that same query to the name service master node 1030 and installs the result into the local cache. The client node then may use the uniform unique identifier to determine the primary name service node 1040 that contains the directory's key value store.

Figure 11:
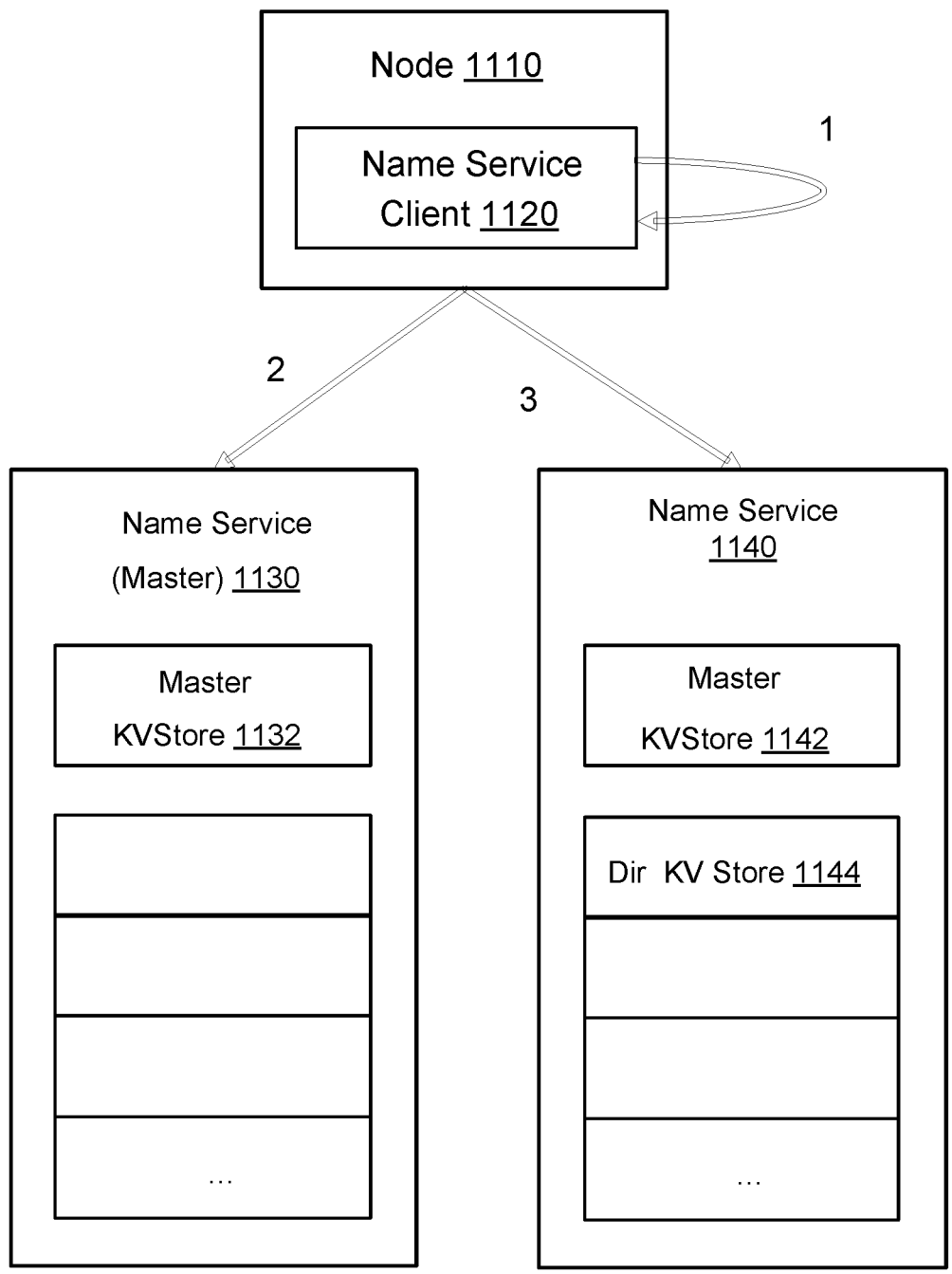
FIG. 11 is an illustration of components and processes of a name service conducting a list directory operation.

FIG. 11 is an illustration of components and processes of a name service client 1120 conducting a list directory operation. When a name service client 1120 needs to lookup an existing directory, the client looks up the directory's pathname to find the directory's uniform unique identifier and its primary name service node. The client then sends the list directory request to the primary name service node 1140 which returns all of the keys in that uniform unique identifier key value store 1144.

Figure 12:
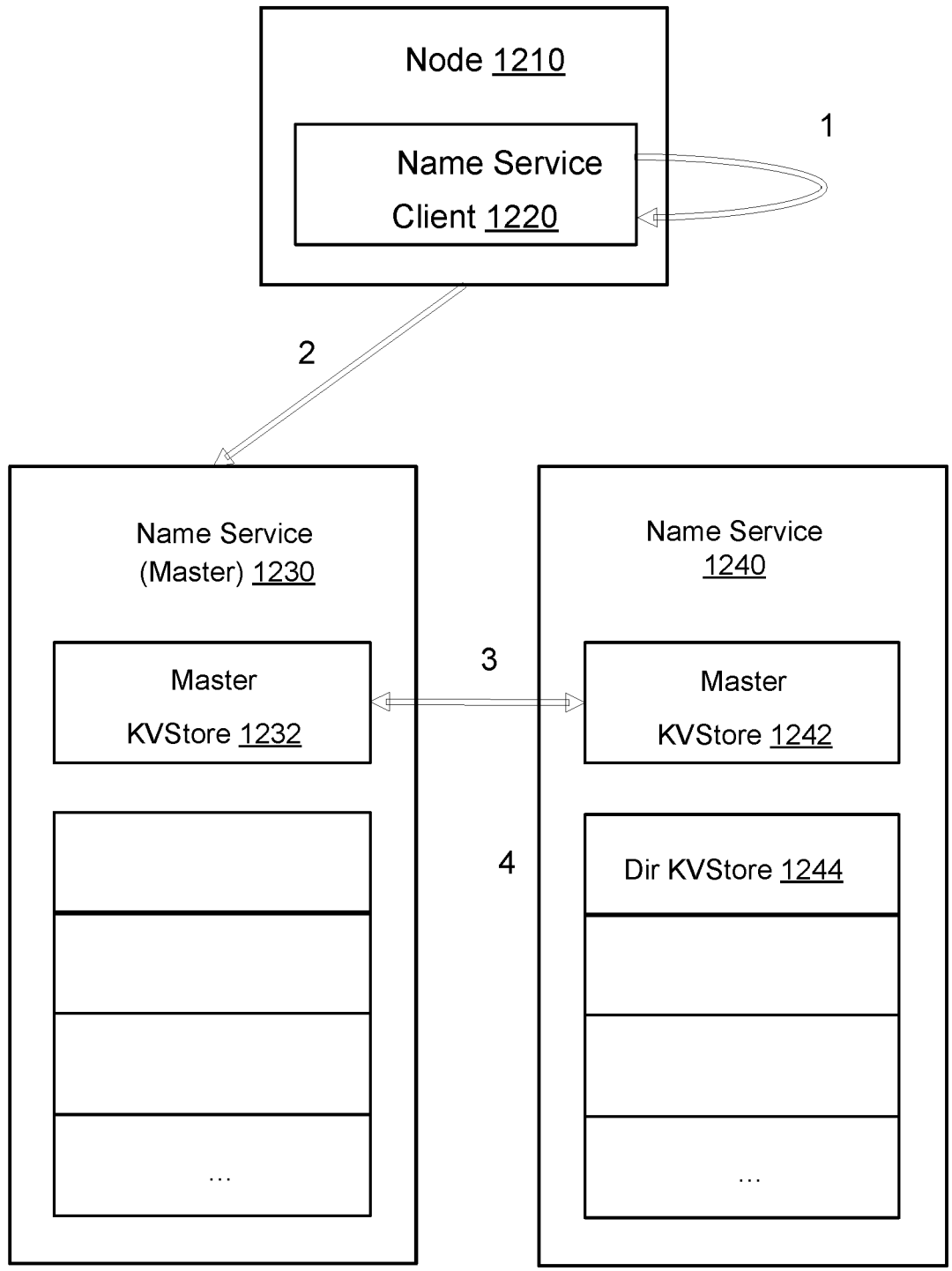
FIG. 12 is an illustration of components and processes of a name service conducting a create directory operation.

FIG. 12 is an illustration of components and processes of a name service 1210 conducting a create directory operation. For any node containing a name service client 1220, when it receives name service create directory request, the client looks up parent directory to find its uniform unique identifier and primary name service node. Then, the client sends a request to parent's primary name service node which creates a uniform unique identifier and an entry for new directory in the parent's directory key value store 1244. Or alternatively, it will return an error if directory already exists. Then, the client uses new directory's uniform unique identifier to locate its primary name service node 1240 and requests creation of new directory's directory key value store.

Then, the client can request the name service master node to create an entry for new directory's (pathname: uniform unique identifier) association, and client adds that same entry to its local cache 1220.

Figure 13:
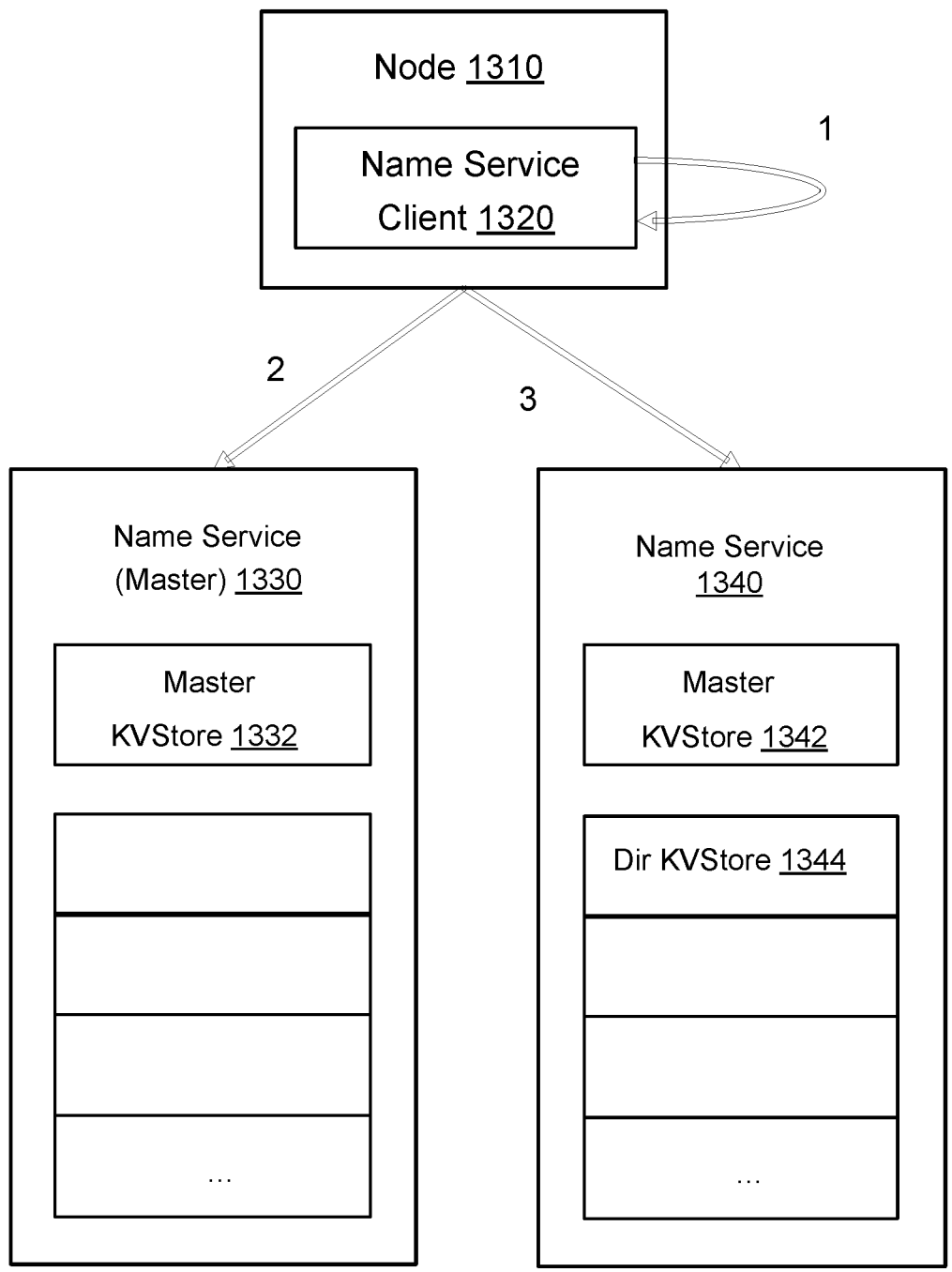
FIG. 13 is an illustration of components and processes of a name service conducting a create/remove/lookup object operation.

FIG. 13 is an illustration of components and processes of a name service 1320 conducting a create/remove/lookup object operation. For a node containing a name service client 1320, when it receives a name service create/remove/lookup object request, the client looks up pathname of parent directory to find that directory's uniform unique identifier and primary name service node. Then, the client sends the create/remove/lookup object (UUID, Object filename) request to that node 1340.

Figure 14:
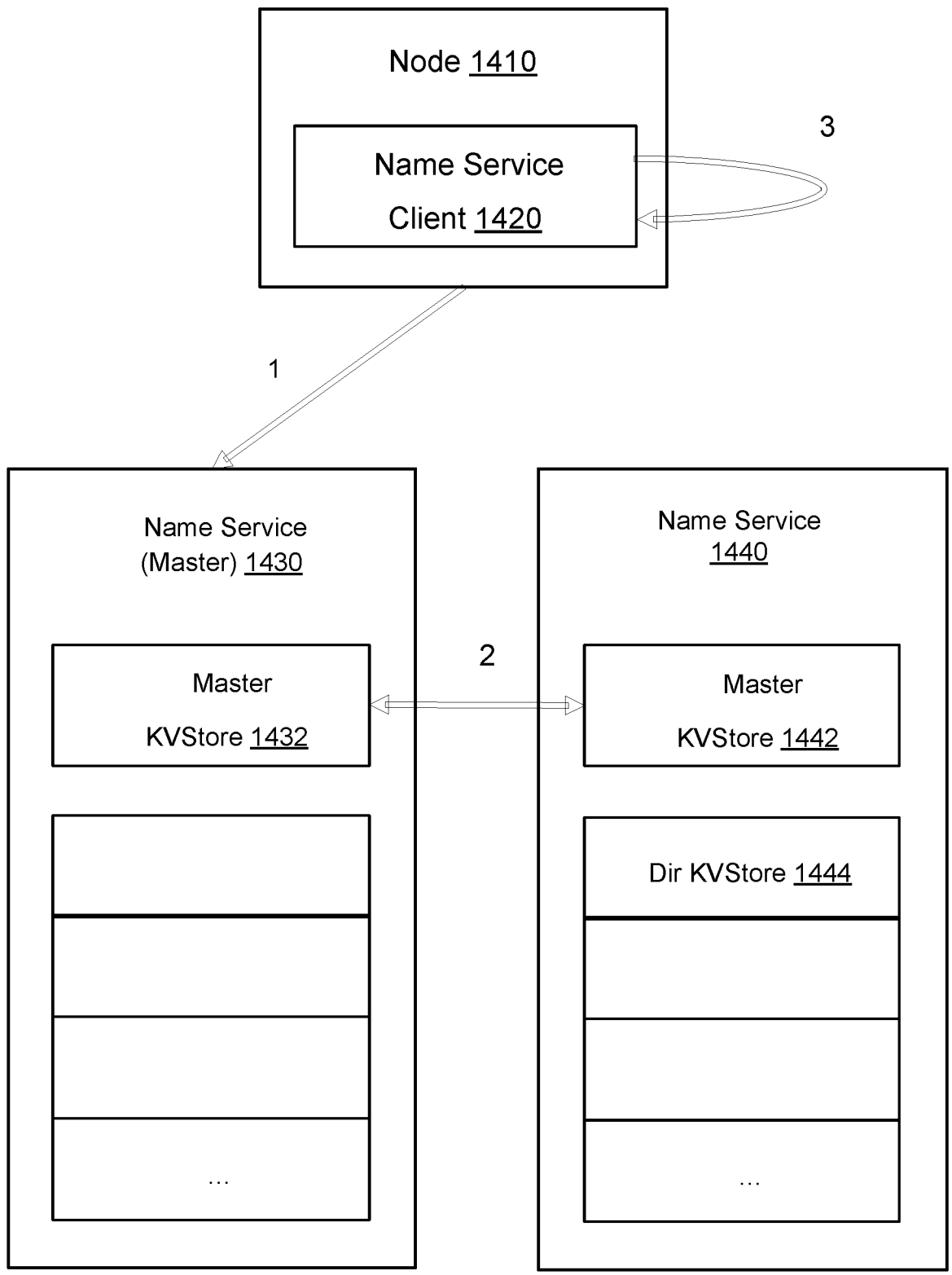
FIG. 14 is an illustration of components and processes of a name service conducting a rename directory.

FIG. 14 is an illustration of components and processes of a name service 1410 conducting a rename directory. For any node 1410 containing a name service client 1410, when it receives a name service rename directory request the client sends the rename directory request to name service master node where it does a range query for all pathnames with that directory pathname prefix, changes the key of such entries to reflect the renamed prefix, increments the entry's version number, and syncs the modification to all name service nodes. If the client does that same range query to update or invalidate matching keys in its local cache, other clients can detect stale cache entries by mismatch of a version number.

Figure 15:
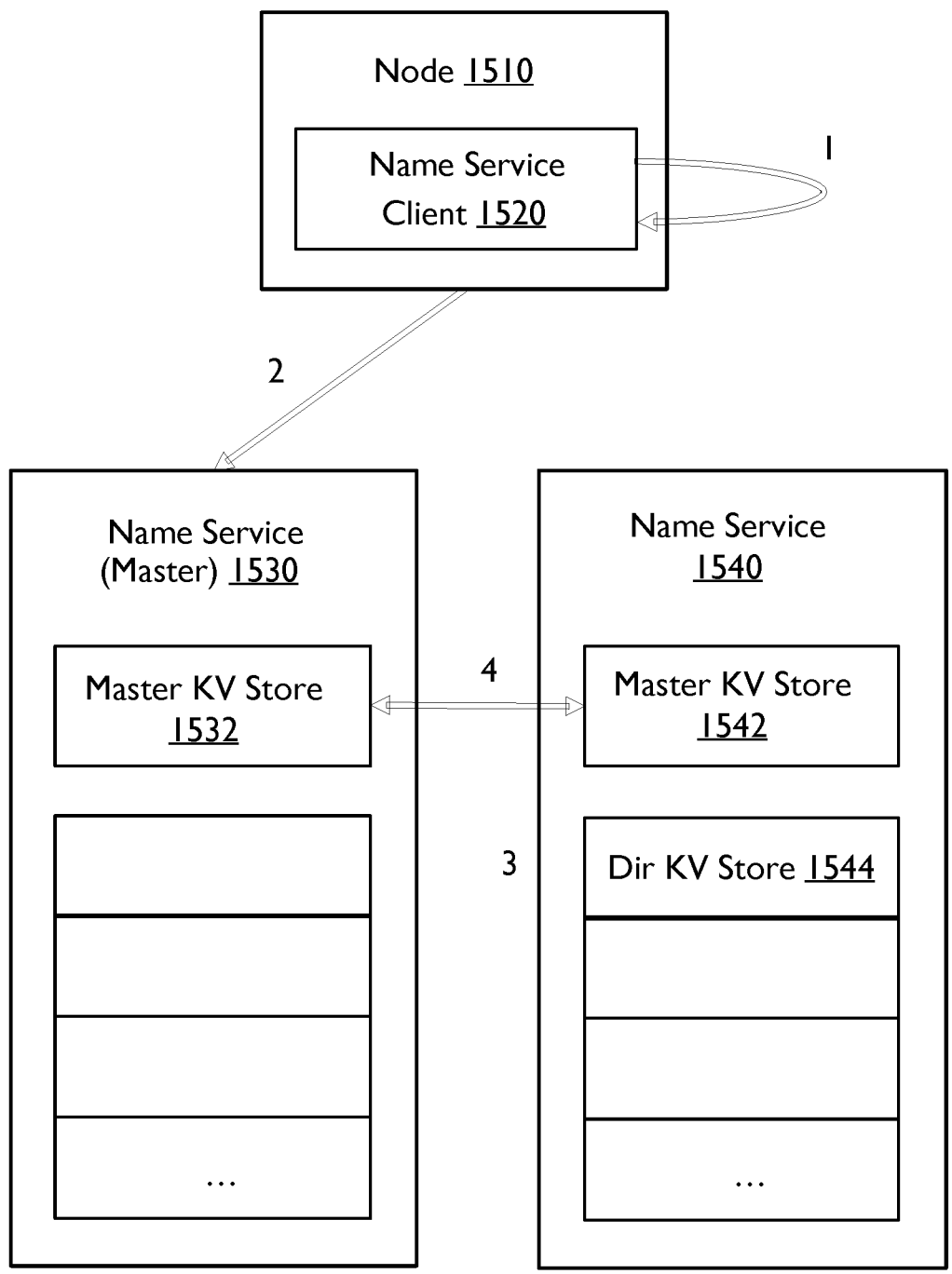
FIG. 15 is an illustration of components and processes of a name service conducting a remove directory.

FIG. 15 is an illustration of components and processes of a name service 1510 conducting a remove directory. For any node contains name service client, when it receives name service remove directory request, the client removes local cache of directory and UUID. Then, the client sends a remove directory request to name service master node. The name service master node then sends a remove directory key value store request to the primary name service node of the corresponding shard. Finally, the name service master node can sync the entry delete operation to all name service nodes.

While various embodiments of the invention have been described above, they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, the various features and functionality described in one or more of the individual embodiments are not limited in their applicability to the particular embodiment with which they are described. They instead can be applied alone or in some combination, to one or more of the other embodiments of the disclosure, whether or not such embodiments are described, and if such features are presented as being a part of a described embodiment. Thus, the breadth and scope of the present disclosure should not be limited by any of the above-described exemplary embodiments.

In this document, the terms "module" and "engine" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

In this document, the terms "computer program product", "computer-readable medium", and the like, may be used generally to refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), when executed, enable the computing system.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated.

The presence of broadening words and phrases such as "one or more," "at least," "but not limited to", or other like phrases in some instances shall not be read to mean that the narrower case is intended or required in instances where such broadening phrases may be absent.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements or controllers may be performed by the same processing logic element or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processing logic element. Additionally, although individual features may be included in different claims, these may possibly be advantageously combined. The inclusion in different claims does not imply that a combination of features is not feasible and/or advantageous. Also, the inclusion of a feature in one category of claims does not imply a limitation to this category, but rather the feature may be equally applicable to other claim categories, as appropriate.

The invention claimed is:

1. A name service method in a distributed memory object system, the name service method comprising:
   electing a primary node for the master key value store from a plurality of name service nodes, the primary node to receive master key value requests;
   a master key value store containing an entry for each directory within the distributed memory object, wherein the master key value store is configured for associating a directory pathname to a uniform unique identifier;
   replicating the master key value store across the plurality of name service nodes;
   distributing, by a data sharding module, data to the plurality of name service nodes for load balancing;
   storing, by a write ahead log, persistence transactions, wherein the plurality of name service nodes are hashed into a consistent hash ring; and
   syncing, by a sync copier, data between the plurality of name service nodes, directories to be stored in a key value store.

2. The method of claim 1, wherein each directory is a separate key value store instance and is identified by the directory's uniform unique identifier.

3. The method of claim 2, wherein each key value store contains an entry for each of its objects and sub-directories keyed on the object filename.

4. The method of claim 1, further comprising locating a directory using a hash-distribution using the directory uniform unique identifier.

5. The method of claim 1, further comprising caching recently opened uniform unique identifiers keyed by their full pathname.

6. The method of claim 1, further comprising a name service node looking up an existing directory by querying a local cache of the name service node using a directory pathname to find the directory uniform unique identifier;
   if the directory pathname is not in the local cache, the name service node then querying the primary node using a directory pathname to find the directory uniform unique identifier, and installing the query result into the local cache.

7. The method of claim 1, further comprising a name service node queries a list directory request by looking up an existing directory by querying a directory pathname to find the directory uniform unique identifier and its primary service node; and
sending the list directory request to the primary name service node which returns all of the keys in the directory's uniform unique identifier key value store.

8. The method of claim 1, further comprising a name service node creating a directory when it receives a directory request, wherein creating a directory includes:
looking up a parent directory to identify its uniform unique identifier and primary name service node;
sending a request to the parent directory's primary name service node which creates a uniform unique identifier and an entry for a new directory in the parent directory key value store;
using the new directory uniform unique identifier to locate a primary name service node and then requesting creation of the new directory key value store; and
requesting a name service master to create an entry for a new directory association and then adding the entry to a local cache.

9. A name service computing device in a distributed memory object system, the name service comprising:
a primary node for the master key value store, wherein the primary node is selected from a plurality of name service nodes and is configured to receive master key value requests;
a master key value store containing an entry for each directory within the distributed memory object, wherein the master key value store is configured to associate a directory pathname to a uniform unique identifier;
the system further being in communication with the plurality of name service nodes, wherein the master key value store is replicated across the plurality of name service nodes;
a data sharding module to distribute data to the plurality of name service nodes for load balancing;
a write ahead log to store persistence transactions, wherein the plurality of name service nodes are hashed into a consistent hash ring; and
a sync copier to sync data between the plurality of name service nodes, directories to be stored in a key value store.

10. The system of claim 9, wherein each directory is a separate key value store instance and is identified by the directory's uniform unique identifier.

11. The system of claim 10, wherein each key value store contains an entry for each of its objects and sub-directories keyed on the object filename.

12. The system of claim 9, wherein the name service locates a directory using a hash-distribution using the directory uniform unique identifier.

13. The system of claim 9, wherein the name service caches recently opened uniform unique identifiers keyed by their full pathname.

14. The system of claim 9, wherein the name service node is configured to look up an existing directory by querying a local cache of the name service node using a directory pathname to find the directory uniform unique identifier, and if the directory pathname is not in the local cache, the name service node is configured to query the primary node using a directory pathname to find the directory uniform unique identifier, and install the query result into the local cache.

15. The system of claim 9, wherein the name service is configured to query a directory pathname to find the directory uniform unique identifier and its primary service node and to send the list directory request to the primary name service node which returns all of the keys in the directory's uniform unique identifier key value store.

16. The system of claim 9, further comprising a name service node being configured to create a directory when it receives a directory request, wherein the name service node is configured to look up a parent directory to identify its uniform unique identifier and primary name service node, to send a request to the parent directory's primary name service node which creates a uniform unique identifier and an entry for a new directory in the parent directory key value store, to use the new directory uniform unique identifier to locate a primary name service node and then requesting creation of the new directory key value store, and to request a name service master to create an entry for a new directory association and then adding the entry to a local cache.

* * * * *